United States Patent [19]
Hanke

[11] 3,796,219
[45] Mar. 12, 1974

[54] COATED TAMPON

[75] Inventor: David E. Hanke, Winnebago, Wis.

[73] Assignee: Kimberly-Clark Corporation, Neenah, Wis.

[22] Filed: Mar. 24, 1971

[21] Appl. No.: 127,853

[52] U.S. Cl. ............................... 128/285, 106/197
[51] Int. Cl. ............................................. A61f 13/20
[58] Field of Search ........... 128/263, 270, 285, 296; 106/197

[56] References Cited
UNITED STATES PATENTS

| | | | |
|---|---|---|---|
| 2,840,485 | 6/1958 | Greminger, Jr. et al. | 106/197 R |
| 3,485,651 | 12/1969 | Ganz | 106/197 R |
| 2,808,832 | 10/1957 | Myers et al. | 128/285 |
| 2,849,000 | 8/1958 | Lewing | 128/285 |
| 3,005,456 | 10/1961 | Graham, Jr. | 128/285 |
| 3,369,544 | 2/1968 | Crockford | 128/285 |
| 3,428,044 | 2/1969 | Whitehead et al. | 128/285 |
| 3,595,236 | 7/1971 | Corrigan et al. | 128/285 |

FOREIGN PATENTS OR APPLICATIONS

| | | | |
|---|---|---|---|
| 722,629 | 1/1955 | Great Britain | 128/285 |
| 735,370 | 8/1955 | Great Britain | 128/285 |
| 765,457 | 1/1957 | Great Britain | 128/285 |

*Primary Examiner*—Charles F. Rosenbaum
*Attorney, Agent, or Firm*—Daniel J. Hanlon, Jr.; William D. Herrick; Raymond J. Miller

[57] ABSTRACT

A water-soluble, thermoplastic compound especially suitable for hygienic and medical applications, such as for use as an insertion aid coating for tampons and as the matrix structure for suppositories. The compound is composed of a thermoplastic, film-forming water-soluble polymer and a compatible plasticizer for the polymer. The preferred polymer is hydroxypropyl cellulose. The preferred plasticizer is an olefinic glycol of predetermined molecular weight. One example of a preferred plasticizer is polyethylene glycol having a molecular weight of less than about 1,500. Another example of a preferred plasticizer is propylene glycol and polymers thereof below a molecular weight of about 750. These compounds are thermoplastic and may be cast, thermoformed, hot melt dip coated, or transfer molded.

4 Claims, No Drawings

COATED TAMPON

RELATED APPLICATIONS

U.S. Pat. application Ser. No. 127,818 filed on even date herewith is now U.S. Pat. No. 3,672,056.

BACKGROUND OF THE INVENTION

In the hygienic and medical field there is a need for a water-soluble compound which at ambient temperatures is in the form of a tough but soft and flexible solid, or in the form of a flexible film. The solid and film forms should both have the ability to dissolve readily upon contact with body fluids. The solidified compound preferably should also have a surface which provides reduced frictional resistance under shear, especially when in rubbing contact with body surfaces. A further required major characteristic is that the compound be stable at room temperatures, i.e., from about 68° to 75°F, up to at least 150°F and higher.

One area of activity in which there is a special need for a water-soluble compound with a friction-reducing surface is as an insertion-aid coating suitable for application to at least the tip portion of compressed absorbent tampons. Another potentially useful area is in the suppository field where such compounds may act as both the structural or matrix portion of a suppository and as the vehicle or carrier for medicaments. There are other potential uses for the type of compound which meets the above defined characteristics, but the following description will relate principally to the utilization of such a compound in the tampon and suppository field.

DISCUSSION OF THE PRIOR ART

Prior to this invention, insertion-aid coatings for tampons consisted primarily of two types. In one type the entire coating, or a major portion thereof, was comprised of a lubricant such as liquid petrolatum, emulsified mineral oil, soft waxes or the like. While these coatings functioned well as lubricants, they were detrimental to the absorptive capabilities of the tampon and relatively unstable at elevated temperatures, such as 150°F, which are commonly encountered under routine handling and shipping conditions.

As the art developed a second type of insertion-aid coating was introduced. In this second type, the coating was changed to one which was fluid-soluble and preferably had a surface which was smooth when dry and slippery when wet. A long list of such coatings may be found in U.S. Pat. Nos. 2,340,311 of Feb. 1, 1944 and 2,440,141 of Apr. 20, 1948. In the type coatings defined in these latter two patents, insertion ease depends primarily upon a reduced coefficient of friction obtained by having a surface with the "properties of smoothness when dry and slipperiness when wet." In accordance with those teachings, the coatings had no real lubricating effect until the surface was moistened. Many of these coatings also deteriorate at the high temperatures encountered under normal shipping and storing conditions, giving them poor aging characteristics.

Efforts to obtain a lubricating effect by utilizing internal mobility of the coating itself prompted the more recent introduction of various combinations of polyethylene glycols for such use, in combination with various other materials. Assignee's copending U.S. application Ser. No. 807,490 filed Mar. 17, 1969 and now U.S. Pat. No. 3,595,236, describes coatings of this nature. In essence the coatings described in this application are mixtures of at least two polyethylene glycols, each of a different molecular weight, plus powdered starch or similar fillers. These coatings as initially applied to tampons have a smooth velvety appearance and are not tacky or sticky to the touch. When these coatings are applied to the tampon by dipping, spraying or the like, they do not immediately penetrate into the tampon body or cause it to re-expand; and this is a desirable feature, especially for highly-compressed, self-sustaining tampon bodies which must retain their compressed state during processing. In their prime condition the interior portion of these coatings remain sufficiently mobile to provide some slip by a shearing action which reduces friction and aids insertion. However it has been found that as the coatings age, and are subjected to the usual high temperatures which occur during shipping and storage, fluid portions migrate into the tampon body and the resulting crystallization of remaining higher molecular weight polyethylene glycols eventually causes the coatings to discolor, crack, and to dry out to a pont where they no longer can perform their intended function.

In reviewing the prior art directed to suppositories, it will be found that most suppositories now being marketed have a base of cocoa butter, hydrogenated fats or similar natural and synthetic fatty substances which have a melting point approximately that of normal body temperature. Another common type of suppository comprises soft gelatin capsules which contain an oleaginous fluid plus analgesics or medicaments. Both types rapidly liquefy or release fluids shortly after being inserted in the body. This liquefaction often results in a gushing discharge of fluid from the body orifice, which, of course, is highly undesirable. Many types of suppositories must be kept under refrigeration to prevent premature melting. In addition, suppositories having a water-soluble base have limited stability and lose water in storage with resultant gross changes in shape and aesthetics. In certain types of suppositories, thin protective coatings, which may also contain medicaments or the like are sometimes used to reduce premature melting. In any event, the reliance on body heat for liquefaction and distribution of medicaments is at best an undesirable condition, so that when suppositories in general are used, special care must be taken to prevent the liquefied substance from inadvertently running out and soiling clothing or bed linens. This problem is so severe as to limit the usage of some suppositories to situations which require the body to be in a supine or prone position when applied, in order to maintain the active fluid ingredients within the body cavity.

The compound of this invention overcomes the respective disadvantages for known tampon coatings and suppository structures mentioned above. The compound comprises a thermoplastic water soluble film-forming polymer which by itself has little or no lubricity. This polymer is blended with, or dissolved in, a compatible organic plasticizer. When the polymer is processed as described in this invention, the resulting compound has what may be called a shear dependent lubricity, i.e., when the surface is frictionally engaged or rubbed as during the insertion into a body cavity, surface shear liberates fresh areas of the polymer-plasticizer matrix, which in turn shear away and uncover still more surface area as the friction continues. Another way to define shear-dependent lubricity is that as force is applied to the compound in a plane tangent to the surface there is a displacement of the contacted surface portion from its immediately adjacent interior portion.

Since the compound is water-soluble, continuous contact with aqueous body fluids dissolves the coating away completely when it is used as a thin tampon coating. Similarly, when it is used as the matrix of a suppository, the compound has its surface gradually eroded away by body fluids, which makes it suitable for long-term treatments. In other words, such controlled "erosion" will continually release fresh medicaments as intended for relief of the condition being treated, whether these medicaments are water-soluble and dissolved in the polymer plasticizer matrix or water-insoluble and dispersed therein.

Accordingly, it is the principal object of this invention to provide an improved compound for hygienic and medical use.

It is a further object of the invention to provide a heat stable water-soluble friction-reducing coating as an insertion-aid and/or a medicament vehicle for absorbent tampons.

Another object is to provide a heat stable water soluble compound suitable for use as the matrix for immediate or deferred action suppositories, providing a vehicle for medicaments as well as being the main suppository structure.

Other advantages will become apparent by reference to the following summary and detailed description.

SUMMARY OF THE INVENTION

The compound of this invention is comprised of a thermoplastic, film-forming, water-soluble polymer in blend with a compatible organic plasticizer of predetermined molecular weight.

A preferred thermoplastic polymer is hydroxypropyl cellulose (hereinafter sometimes referred to as HPC). Preferred plasticizers include polyethylene glycols (hereinafter sometimes referred to as PEG) of a molecular weight which is further defined hereinafter, and propylene glycols and polymers thereof (hereinafter sometimes referred to as PPG) of a molecular weight which is also further defined hereinafter.

In order to avoid unnecessary repetition and for the sake of brevity in the following description, the above-identified letter abbreviations will frequently be used to identify the polymers and plasticizers used in the specific examples. The numbers following the letter abbreviations will serve to identify the approximate molecular weight. For example, PEG 400 will mean polyethylene glycol with an average molecular weight of about 400. HPC 75,000 will identify hydroxypropyl cellulose with an average molecular weight of about 75,000. Whenever reference is made to molecular weight it is also understood that this indicates average molecular weight as it is commonly used in the art.

DETAILED DESCRIPTION

The following discussion will be useful in providing additional background as well as identifying suitable molecular weights for the plasticizers and polymers employed.

Hercules, Incorporated, a supplier of hydroxypropyl cellulose, under the registered trademark KLUCEL, indicate on page 8 of their 1968 technical brochure which is further identified by the number 879-32327, that high molecular weight polyethylene glycols and high molecular weight polypropylene glycols are compatible with hydroxypropyl cellulose at elevated temperatures. However, it has been found that those polyethylene glycols and polypropylene glycols which the art classifies as "high molecular weight" polymers are not compatible. For example, hydroxypropyl cellulose in the lower commercially available molecular weight range (about 75,000) is totally insoluble in the polyethylene glycols and the polypropylene glycols rated as high molecular weight polymers.

An examination of the molecular weights used commercially such as are identified on page 6 of Union Carbide's 1970 brochure entitled "Chemicals and Plastics Physical Properties" (F-6136X, 11/69 - 40M), finds that the high molecular weight polyethylene glycols start at about 1,500. It has been found that PEG with a molecular weight of 1,500 is completely incompatible with HPC 75,000 at both ambient and elevated temperatures. Compatibility was found to begin somewhere between a PEG molecular weight of 1,000 and 1,500.

Page 12 of the same Union Carbide brochure cited above discloses high molecular weight polypropylene glycols begin at about 1,007.

A similar observation may be made by reference to page 3 of Dow's technical brochure Form No. 111-430-69 on polypropylene glycols.

It has also been found that PPG with a molecular weight of 1,000 is completely incompatible with HPC 75,000 at ambient and elevated temperatures. Compatibility for PPG was found to begin somewhere between molecular weights of over 85 and under 1,000.

In preparing the various versions of the compound, the plasticizer is first heated to a temperature of about 285°F under continuous agitation in an inert atmosphere such as nitrogen. Then the thermoplastic water-soluble polymer (hydroxypropylcellulose or HPC) is added and while maintaining the mixture under continuous agitation the temperature is raised sufficiently high to obtain a smooth blend or solution. The blended mixture is then cooled to about 265°F at which point suitable medicaments may be added, if desired. The temperature of medicament addition may be lower depending upon its thermal stability and the nature of the forming operation.

The coating may now be applied to tampons by dipping the tampon tips in the warm compound and allowing the coating to set. Suppositories may be made from the compound by casting, by thermoforming, or by transfer molding procedures.

In accordance with this invention, and as indicated above, compounds having the aforementioned characteristics may be formed by using hydroxypropyl cellulose as the thermoplastic film-forming water-soluble polymer and selected polyethylene glycols or selected polypropylene glycols as the compatible plasticizing polymer. The use of PEG will first be described.

In working up to the development of a suitable compound, many tests were made of various combinations of HPC and PEG before a suitable compound was achieved. In combining these two chemicals, it was determined that while a number of low molecular weight PEG's are useful, certain intermediate weight PEG's are preferred.

The following are some examples of this development work, and in addition to the preferred embodiments include several unsuccessful and/or useful but less desirable combinations.

EXAMPLE 1

120 grams of PEG 200 (a colorless liquid having a molecular weight of about 200) were heated under a nitrogen atmosphere and constant stirring to a temperature of about 285°F.

85 grams of HPC 75,000 (a white powder) were added and thoroughly mixed into the heated PEG 200 while the temperature was raised to about 320°F. A clear very viscous solution was obtained. The mixture was coated on the end of a tampon by dipping the tampon tip in the heated solution. The resulting coating was sticky, runny and generally unstable, never taking a good set. Accordingly, this example was adjudged completely unsatisfactory for tampon or suppository use.

EXAMPLE 2

120 grams of PEG 200 were heated under a nitrogen atmosphere and under constant stirring to a temperature of about 285°F. 30 grams of HPC 275,000 (a white powder) were added with continued stirring at 300°F. The solution became clear and very thick. Tampons dipped at 300°F were very sticky and smeary thus making them completely unacceptable for use as a tampon coating.

EXAMPLE 3

This is identical to Example 2 except that 20 grams of HPC 900,000 was substituted for HPC 275,000. A very thick solution was obtained. It was generally too thick to stir and impractical to use.

EXAMPLE 4

120 grams of PEG 400 (also a colorless liquid and having a molecular weight of about 400) were heated under a nitrogen atmosphere and under constant stirring to a temperature of about 285°F. 300 grams of HPC 75,000 (a white powder) were added and thoroughly mixed in the heated PEG 400 while the temperature was raised to about 320°F and a clear solution achieved. The mixture was coated on the end of a tampon by dipping the tampon tip into the heated solution. The coating was quite stringy and sticky when the dipped tampon was withdrawn. The cooled and set coating was clear and transparent and very tacky. While this coating exhibited shear-dependent lubricity, it was considered marginal for tampon coating or suppository use because of its extremely tacky nature.

EXAMPLE 5

This was prepared as in Example 4 but 40 grams of HPC 75,000 were used. The cooled and set coating on the tampon was slightly less tacky than that of Example 4 and had a somewhat rubbery feel. This coating was considered marginal for tampon use. That is, while its resistance to insertion was somewhat less than for an uncoated tampon, the tackiness exhibited detracts from its desirability.

EXAMPLE 6

This was the same as Example 4 but employed 50 grams of HPC 75,000. The set coating had only a slight tack and a very rubbery feel. This coating was also in the marginal area, but was adjudged as somewhat better than Example 5 because of the reduction in tackiness.

EXAMPLE 7

This was the same as Example 4 but contained 60 grams of HPC 75,000. The set coating was barely tacky and very rubbery. It was considered quite satisfactory and an improvement over Example 6.

EXAMPLE 7A 120 grams of PEG 400 were heated to about 285°F as in Example 4. 30 grams of HPC 275,000 (a white powder) were added and thoroughly mixed while the temperature was raised sufficiently to achieve a clear solution. When applied to a tampon the coating of this example was water clear and rubbery without tack. It exhibited excellent shear-dependent lubricity properties.

EXAMPLE 8

120 grams of PEG 600 (a colorless oily liquid having a molecular weight of about 600) were mixed with 30 grams of HPC 75,000 under the same conditions as in Example 1. The mixture was allowed to cool to 280°F before dipping tampons therein. As the tampon was withdrawn, the coating appeared stringy and sticky. However, after cooling and setting, the outer surface of the set coating was not tacky, but quite rubbery. Rubbing the surface of the coating with the finger appeared to provide some surface shear with the result that fresh fluid glycols were liberated or exposed on the surface at the rubbed areas. This phenomenon can be described as a shear-dependent lubricity. Because of the sliding effect thus provided, this coating was considered to be quite satisfactory for use as a tampon coating, and for suppositories. In addition, it was found that the coating remained stable when coated on a tampon, or cast as a suppository, even when exposed to temperatures of at least 150°F for extended periods. Because of this latter characteristic the coating was considered superior to known shear-dependent coatings.

EXAMPLES 9-10

These were similar to Example 8 except that in Example 9, 40 grams of HPC 75,000 were used and in Example 10, 50 grams of HPC 75,000 were used. The unset coating in each case was sticky and stringy, but the set coating was found to be non-tacky and very rubbery. Again, when rubbed with the finger, the above-described sliding effect and shear-dependent lubricity was observed. These two examples were also in the preferred range for tampon coatings and suppositories for the reasons set forth for Example 8.

EXAMPLE 11

This procedure was identical to Example 8 except that 20 grams HPC 900,000 were used instead of 30 grams of HPC 75,000. The mixture at 300°F was very thick and 90 grams of PEG 600 had to be added with continuous mixing to enable dip coating a stick tampon. The resultant coating was water white and rubbery and gave a slight indication of shear generated lubricity. Thus the coating would only be marginally satisfactory for coating tampons, but would be satisfactory for use as a suppository matrix.

EXAMPLE 12

120 grams of PEG 1000 (an opaque, waxy solid with a molecular weight of about 1000) were heated under nitrogen atmosphere to a temperature of about 300°F which was sufficiently high to melt the solid to a liquid state. 40 grams of HPC 75,000 were added to the hot PEG 1000 under constant stirring to obtain a smooth blend. A tampon was dipped into this mixture to coat the end. When set the coating was relatively hard and smooth. It exhibited shear-dependent lubricity when rubbed and was judged as suitable for coating tampons and the like, although it was considered not as good as coatings containing the intermediate weight PEG 600.

EXAMPLE 13

120 grams of PEG 1500 (a waxy solid with a molecular weight of about 1500) were heated to a temperature of 325°F under nitrogen atmosphere and constant stirring. 30 grams of HPC 75,000 were added. The mixture remained granular and did not dissolve completely. The resulting compound was considered unsatisfactory for tampon coatings or suppository use.

EXAMPLE 14

120 grams of PEG 4000 (a waxy solid with a molecular weight of about 4000) was heated as in Example 13. When 30 grams of HPC 75,000 were added, the mixture remained granular as in Example 13 and was completely unsatisfactory for the proposed use.

EXAMPLE 15

120 grams of propylene glycol (a liquid with a molecular weight of about 85) was heated to 225°F in the usual manner and 60 grams of HPC 75,000 added. The latter quickly dissolved. The coating was runny, tacky, and generally unstable as in Example 1 and therefore totally unsuited for the proposed use.

EXAMPLE 16

120 grams of polypropylene glycol with a molecular weight of about 400 (a clear oily liquid) were heated to a temperature of 290°F and 40 grams of HPC 75,000 mixed thoroughly therein. A tampon was coated with the compound by dipping. The set coating was transparent, rubbery and slightly tacky, and still produced the desired sliding effect with the finger rubbing test.

EXAMPLE 17

120 grams of PPG 750 (a clear oily liquid with a molecular weight of 750) were heated to a temperature of 300°F under a nitrogen atmosphere and constant stirring. 10 grams of HPC 75,000 were added. The mixture remained granular and the HPC would not dissolve. It was therefore unacceptable for use.

EXAMPLE 18

120 grams of PPG 1000 (a clear oily liquid with a molecular weight of about 1000) were heated to a temperature of about 300°F under a nitrogen atmosphere and continuous stirring. 50 grams of HPC 75,000 were added. The mixture remained granular and the HPC would not dissolve. This was also completely unacceptable for use.

EXAMPLE 19

120 grams of PPG 2000 (a clear oily liquid with a molecular weight of about 2000) was substituted for the PPG 1000 in Example 18. The results were similar to Examples 17 and 18 and the compound was unsatisfactory for use.

In general the examples described above show that lower molecular weight glycol plasticizers are more efficient than the higher weight materials in plasticizing HPC. Consequently to obtain a coating or suppository that will maintain sufficient body and integrity, it is necessary to use a higher weight fraction of the thermoplastic polymer in the compound as molecular weight of the plasticizer is reduced. It becomes evident that integrity will also be improved if the same amount of a higher molecular weight thermoplastic polymer is used to replace the HPC 75,000 as employed in all the above examples. Similarly when a lower molecular weight HPC is used a much higher weight fraction of the lower weight HPC would be required with the same amount of plasticizer as was used with the higher molecular weight HPC to obtain comparable hardness or integrity.

The examples also demonstrate that plasticizer efficiency with a given molecular weight HPC decreases with increasing molecular weight of the plasticizer. It can therefore be concluded that for HPC 75,000 the glycol which gives the preferred degree of shear-generated surface lubricity is an intermediate molecular weight glycol plasticizer. Similarly when a higher molecular weight HPC is employed, a lower molecular weight glycol plasticizer should be used to provide the preferred shear-generated lubricity.

In addition the examples clearly show that high molecular weight PEG, i.e., 1,500 and above, and high molecular weight PPG, i.e., 750 and above, are incompatible with HPC 75,000 and therefore unsatisfactory as plasticizers.

When an HPC of lower molecular weight than 75,000 was used it too was found incompatible with the high molecular weight PEG and PPG. It follows that higher molecular weight HPC would also be incompatible with these higher molecular weight plasticizers.

From the above examples, and by interpolation, it can be derived that PEG's with a molecular weight somewhat above 200 and somewhat below 1500 when mixed with HPC of a suitable molecular weight will provide compounds with the desired shear dependent lubricity. The same reasoning can apply to the propylene glycols, i.e., PPG's with a molecular weight above 85 and somewhat below 750 are suitable for use.

While the described compounds are suitable for use without additives for coating tampons and fabricating suppositories, it is evident that a large number of compatible medicaments may be readily employed. This is especially true with respect to suppositories. The gradual solvation characteristic of the compound in suppository form when exposed to body fluids provides a means for applying long-lasting controlled-release medication to areas selected for treatment.

Among the well-known substances which are especially suitable for use as bactericides, fungicides, antibiotics and the like in connection with the coated absorbent tampons and vaginal suppositories made in accordance with this invention are the following:

Menthol; camphor; quaternary ammonium salts; 5-Amino-1, 3-bis [2-ethylhexyl] hexahydro-5-methylpyrimidine also identified in short form as hexetidine; chloramphenicol; 2-(tetradecylamino) ethanol lactate also identified in short form as myralact; β, 4-dichloro-α-dichloro-acetamidopropiophenone also identified in short form as cloponone; nystatin; 3-acetamide-4-hydroxyphenylarsonic acid also identified as acetarsone; 5-nitrofurfuraldehyde-semicarbazone also identified as nitrofurazone; benzalkonium chloride and hexachlorophene.

The above compounds include bactericides, fungicides and antibiotics which may be selectively chosen for use in controlling bacteria protozoa and fungi including Trichomonds vaginalis and Candida albicans and the like.

Substances suitable for incorporation in rectal suppositories made in accordance with this invention include:

Menthol; camphor; quaternary ammonium salts; polyphenylmercuric nitrate; ephedrine sulfate; benzocaine, and oxyquinoline benzoate.

Among the above compounds are included several which are considered useful in the relief of hemorrhoidal and associated problems.

Substances suitable for use in absorbent tampons and vaginal suppositories made in accordance with this invention also include steroidal medicaments and estrogenic compounds such as:

Cortisone; estradiol; prednisolone; progesterone; pregnenolone and the salts thereof. In this group are products especially designed to reduce the discomfort and malaise associated with post-menopausal atrophy.

While the above-listed medicaments are particularly pointed out as useful in combination with the compounds of this invention, it will be seen that many other potentially useful medicaments are available. Dosages, of course, should be controlled in accordance with standard practices.

Various identifying colors, dyes and fillers may be incorporated in the compounds as long as they do not interfere with the desired properties set forth herein.

What is claimed is:

1. A tampon in which at least the tip portion thereof is coated with a compound comprising a thermoplastic film-forming water-soluble polymer dissolved in a compatible plasticizer therefor, said polymer comprising hydroxypropyl cellulose and said plasticizer comprising a polyolefinic glycol of a predetermined molecular weight, said molecular weight being in a range which produces a shear-dependent lubricity in said compound, said compound being stable at temperatures up to 150°F and said glycol being selected from the group consisting of a polyethylene glycol with an average molecular weight above 200 and below 1,500, and a polypropylene glycol with an average molecular weight above 85 and below 750.

2. The coated tampon of claim 1 wherein said coating has a medicament mixed therein.

3. The coated tampon of claim 1 wherein said medicament is selected from the group consisting of menthol; camphor; quaternary ammonium salts; hexetidine; chloramphenicol; myralact; cloponone, nystatin; acetarsone; nitrofurazone; benzalkonium chloride and hexachlorophene.

4. The coated tampon of claim 1 wherein said medicament is selected from the group consisting of cortisone; estradiol; prednisolone; progesterone; pregnenolone and the salts thereof.

* * * * *